UNITED STATES PATENT OFFICE.

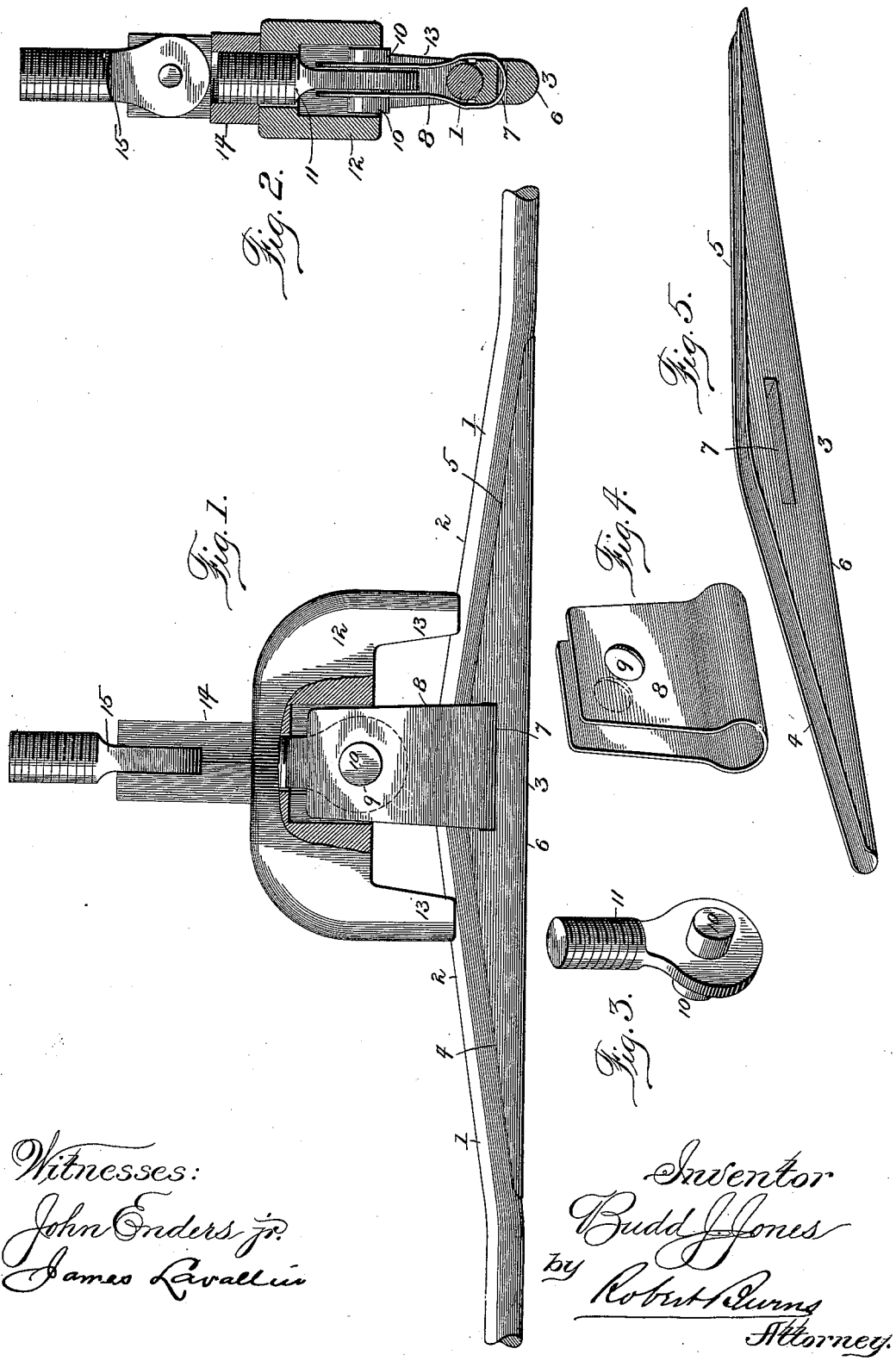

BUDD J. JONES, OF SIOUX CITY, IOWA.

TROLLEY-WIRE SUPPORT.

SPECIFICATION forming part of Letters Patent No. 520,737, dated May 29, 1894.

Application filed February 5, 1894. Serial No. 499,185. (No model.)

*To all whom it may concern:*

Be it known that I, BUDD J. JONES, a citizen of the United States, residing at Sioux City, in the county of Woodbury and State of Iowa, have invented a certain new and useful Trolley-Wire Support; and I do hereby declare the following to be a full, clear, and exact description of the same, reference being had to the accompanying drawings, forming a part of this specification.

This invention relates more especially to means for supporting the trolley wire or conductor of electric railways. The object of the present invention being to provide a simple, durable and efficient means of support, capable of easy and rapid application in a very strong manner so that there will be no tendency to the same being displaced along the trolley wire in use, and which at the same time affords complete metallic connection around the trolley wire, without offering any impediment to the passage of the trolley wheel, in that the support will be of substantially the same width as the trolley wire, and the surface of the support will lie in the same plane as the contact surface of such wire. I attain such object by the construction and arrangement of parts illustrated in the accompanying drawings, in which—

Figure 1, is a side elevation, with parts in section of a trolley wire support constructed in accordance with the present invention; Fig. 2, a transverse sectional elevation of the same; Fig. 3, a detail perspective view of the draw bolt; Fig. 4, a similar view of the stirrup strap, and Fig. 5, a similar view of the supporting piece proper.

Similar numerals of reference indicate like parts in the several views.

Referring to the drawings 1, represents a portion of the trolley wire or conductor, which at the point of application of the support, is in the present invention, formed with a bend 2, of an approximately triangular form, so to form a receiving cavity in the contact surface of the wire into which fits the triangular shaped supporting piece 3, the inclined faces 4 and 5 of which in contact with trolley wire being concaved to fit the wire, while the exposed face 6 is rounded transversely and is in a plane with the contact surface of the trolley wire.

7, is a transverse orifice formed mid-length of the supporting piece 3, through which is looped the stirrup strap 8, the upper ends of which are formed with eyes 9, that engage upon lateral projections 10, on the free end of the straining or clamping bolt 11.

12, is a bridge piece or casting, the legs 13, of which rest upon the surface of the trolley wire, and are concaved to fit the same, while its body portion is recessed out to receive the clamping bolt 11, and the upper ends of the stirrup strap 8.

14, is the clamping nut of the bolt 11, screwing upon the screw threaded end of the same, and having a bearing upon the body of the bridge piece 12.

15, is an eye bolt swiveled to the nut 14, its free end being screw threaded for attachment to the usual insulator, carried by the span wire of an electric trolley wire system.

While my present improved support is shown in the drawings as applied to a simple support for the trolley wire, it is evident that without any material modification it can also be used as an anchor clamp or pull off in line work.

In practical use it is preferable to make the bends 2, in the trolley wire by means of a small hand press, so as to attain the proper and uniform form thereof best adapted to fit the groove or concavity in the surface of the supporting piece 3.

With the present improved construction it will be seen that the passage of the trolley wheel will have no tendency to displace the support, in that each time the trolley wheel passes under it the tendency will be to hold the parts together and in place upon the trolley wire, and against any shifting of the parts upon such wire.

Having thus fully described my said invention, what I claim as new, and desire to secure by Letters Patent, is—

1. In a trolley wire support, the supporting piece of an approximately triangular form, adapted to fit a bend in the trolley wire, with its outer surface on a plane with the surface of the trolley wire, in combination with a bridge piece, a stirrup strap, and means for adjusting the stirrup strap, substantially as set forth.

2. In a trolley wire support, the supporting piece 3, of an approximately triangular form, adapted to fit a bend in the trolley wire, with its outer surface on a plane with the surface of the trolley wire, in combination with a bridge piece, a stirrup strap, a straining bolt and nut, substantially as set forth.

3. In a trolley wire support, the supporting piece 3, of an approximately triangular form, adapted to fit a bend in the trolley wire, with its outer surface on a plane with the surface of the trolley wire, in combination with a bridge piece, a stirrup strap, a straining bolt having lateral projections for engaging eyes formed in the free ends of the stirrup strap, and a clamping nut, substantially as set forth.

In testimony whereof witness my hand this 27th day of January, 1894.

BUDD J. JONES.

In presence of—
C. T. POWELL,
E. MILLER.